Feb. 19, 1935.  P. DE MATTIA  1,991,664
ELECTRICALLY OPERABLE PRESS
Filed March 2, 1932    7 Sheets-Sheet 1

INVENTOR
PETER DE MATTIA
BY
ATTORNEYS

Feb. 19, 1935.  P. DE MATTIA  1,991,664
ELECTRICALLY OPERABLE PRESS
Filed March 2, 1932  7 Sheets-Sheet 5

INVENTOR
PETER DE MATTIA

BY

ATTORNEYS

Feb. 19, 1935. P. DE MATTIA 1,991,664
ELECTRICALLY OPERABLE PRESS
Filed March 2, 1932 7 Sheets-Sheet 6

INVENTOR
PETER DE MATTIA
BY
ATTORNEYS

Patented Feb. 19, 1935

1,991,664

UNITED STATES PATENT OFFICE 1,991,664

ELECTRICALLY OPERABLE PRESS

Peter De Mattia, Passaic, N. J., assignor to National Rubber Machinery Company, Akron, Ohio, a corporation of Ohio Application March 2, 1932, Serial No. 596,227

12 Claims. (Cl. 18—17)

This invention relates to presses and particularly heating and vulcanizing or like presses such as unit vulcanizers for use in making pneumatic tires and inner tubes wherein articles are treated for a period of time under the pressure of the press.

The general purpose of the invention is to provide a rotary motor driven means for operation of a press of this type whereby the installation in factories of expensive fluid pressure systems for operating pressing units such as are generally in use may be avoided and whereby the expense of maintenance and operation of such presses may be substantially reduced.

Due to the time factor involved in the operation of heating and vulcanizing or other presses in which the articles pressed are treated under pressure for a period of time, these have not, so far as is known, been operated electrically or by rotary motor-driven means because, as distinguished from stamping, cutting or punching presses, which are quickly reciprocated, they cannot be substantially continuously driven using part revolution clutches or the like as are stamping, cutting or punching presses.

A particular object of applicant's invention is to provide effective rotary motor driven mechanism for actuating an article-treating press or the like using reversible power driven means and suitable controls whereby the press may be closed by starting rotation of said means in one direction, said means being automatically stopped and set to reverse as said press closes and said means adapted to be again started for reverse rotation after treatment of an article in the press, the controlling devices being adapted to stop the rotary means and to set it to again be driven in the original direction to close the press.

A further object of the invention is to provide in a vulcanizing or like press of the type set forth in the preceding paragraph for treating articles under internal pressure, control means for starting the motor driven element to open the vulcanizer when said internal pressure is released.

A further object of the invention is to provide in a press as described in the foregoing paragraph, an electrically operable reversible motor mechanism for opening and closing the vulcanizer and suitable switches operable by movement of the vulcanizer to open and closed positions to stop the motor and reverse the connections thereto.

A further purpose of the invention is to provide effective manually operable means for starting the motor to open and close the vulcanizer.

The foregoing and other purposes or objects of the invention are attained in the vulcanizer illustrated in the accompanying drawings and described below. It is to be understood that the invention is not limited to the specific form thereof shown and described.

Of the accompanying drawings.

Figure 1:
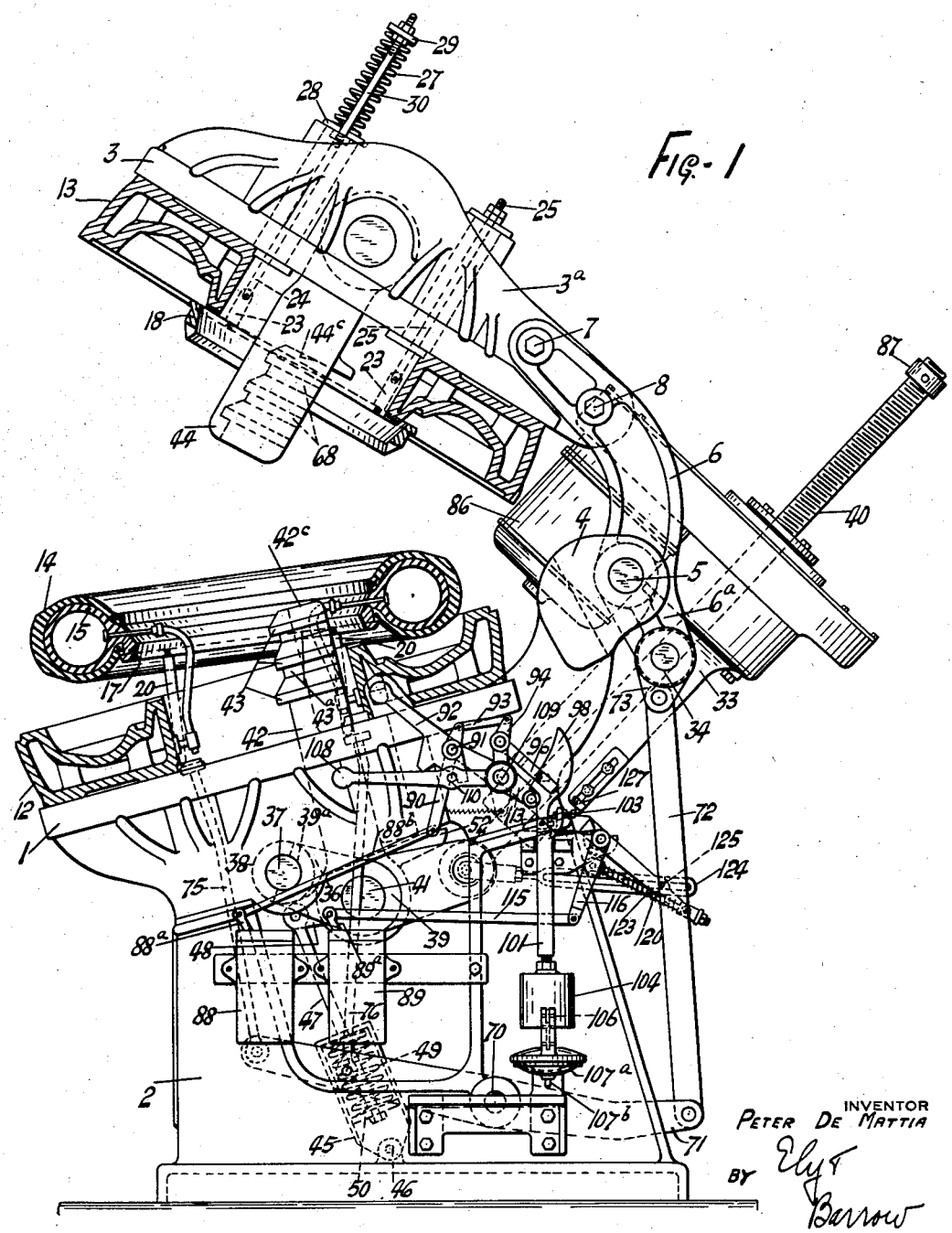
Figure 1 is a side elevation partly in section of a vulcanizer embodying the invention shown in open position.

Referring to the drawings, the vulcanizer comprises a lower fixed platen 1, which is for convenience inclined downwardly as shown, being supported on a suitable base or frame 2. The upper movable platen is indicated at 3. The lower platen 1 is provided at the rear with a pair of spaced arms 4 which are bifurcated and apertured for the reception of axially aligned hinge pins 5. A pair of spaced arms 6 which enter the bifurcated ends of the arms 4 are pivotally supported therein by the hinge pins 5. The hinge arms 6 are secured by means of shouldered bolts 7 and 8 to ribs 3ª on the upper platen. The bolts 7 have a fairly snug fit in said arms and ribs while the bolts 8 have a comparatively loose fit. This construction allows a slight freedom of movement or play of the upper platen 3 in a direction parallel to its axis in the closing and opening of the mold, so as to facilitate and insure the seating and unseating of the mold sections as hereafter described.

A pair of cooperating jacketed annular mold sections or halves 12 and 13 are removably secured to the respective platens 1 and 3 by suitable means (not shown), the mold sections having connections thereto for supplying a heated fluid to the jackets thereof, as is well understood in the art.

The numeral 14 indicates a tire which is adapted to be vulcanized by the apparatus. The tire must be expanded against the mold surfaces during the curing and for this purpose means are provided to supply a fluid under pressure to the interior thereof. This is preferably accomplished by the use of the well-known pressure bag 15 to which steam, air or hot water under pressure may be supplied during the period of vulcanization.

A pair of bead molding rings 17 and 18 are provided and are arranged to engage the beads of the tire and to strip the tire from the mold upon the opening of the vulcanizer, the lower ring 17 being used to support a green, uncured tire spaced from the walls of the molds until the vulcanizer is closed. The bead rings are seated in suitable channels in the mold halves. To actuate the lower ring 17 to strip a tire from the mold, means such as rods 20 may be secured thereto, these extending downwardly through apertures in the mold half 13 and through the lower platen 1 below which the rods project whereby they are adapted to be engaged by mechanism hereinafter described to be lifted with the tire as the mold is opened.

The upper bead ring 18 is supported by suitable means such as a plurality of short posts 23 extending through apertures in the upper mold section, which posts are flexibly secured to rods 24 and 25 extending through apertures in the upper platen. The rods 24 remote from the hinge 5 of the platens are normally urged downwardly by means which may include compression springs 27 acting between a collar 28 fixed on the rods and a cross-head 29 adjustably secured to the platen 3 by the rods 30. The rods 25 are permitted a certain freedom of movement in the upper platen. The downward movement of the bead ring 18 and its limit of separation from the upper mold section is adjustably determined by the position of lock nuts 24a and 25a on the rods 24 and 25.

Figure 7:
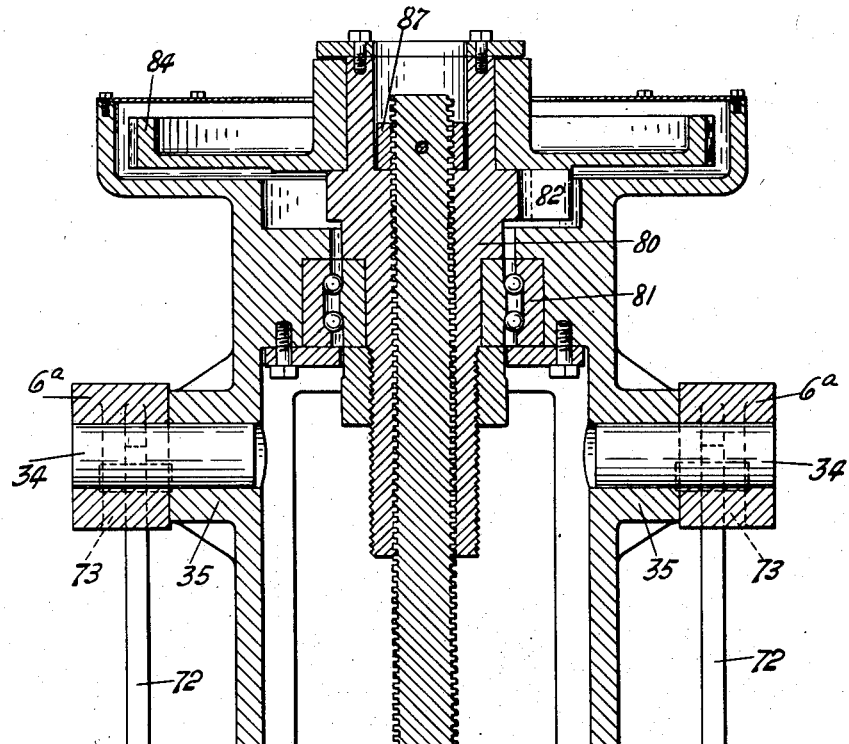
Figure 7 is a section on line 7—7 of Figure 5.

The vulcanizer is preferably arranged so that it can be opened and closed and locked by rotary power driven means and to this end the arms 6 pivotally supporting the movable upper platen 3 are extended past their hinge or pivot as at 6a and pivotally carry a head 33 on stub shafts 34 in the ends of the arms 6 and received in lugs 35 on the sides of the head (see Figure 7). On the under side of the lower platen 1 are formed oppositely positioned substantial bearing lugs 36 in which are located bearing pins 37. On the pins 37 are pivoted by extensions 38 the two arms of a bifurcated lever 39, having upper curved surfaces 39a bearing against the under surfaces of the pins 37. The lower end of the lever 39 is pivotally connected to the rod 40 extending from the head 33.

Figure 2:
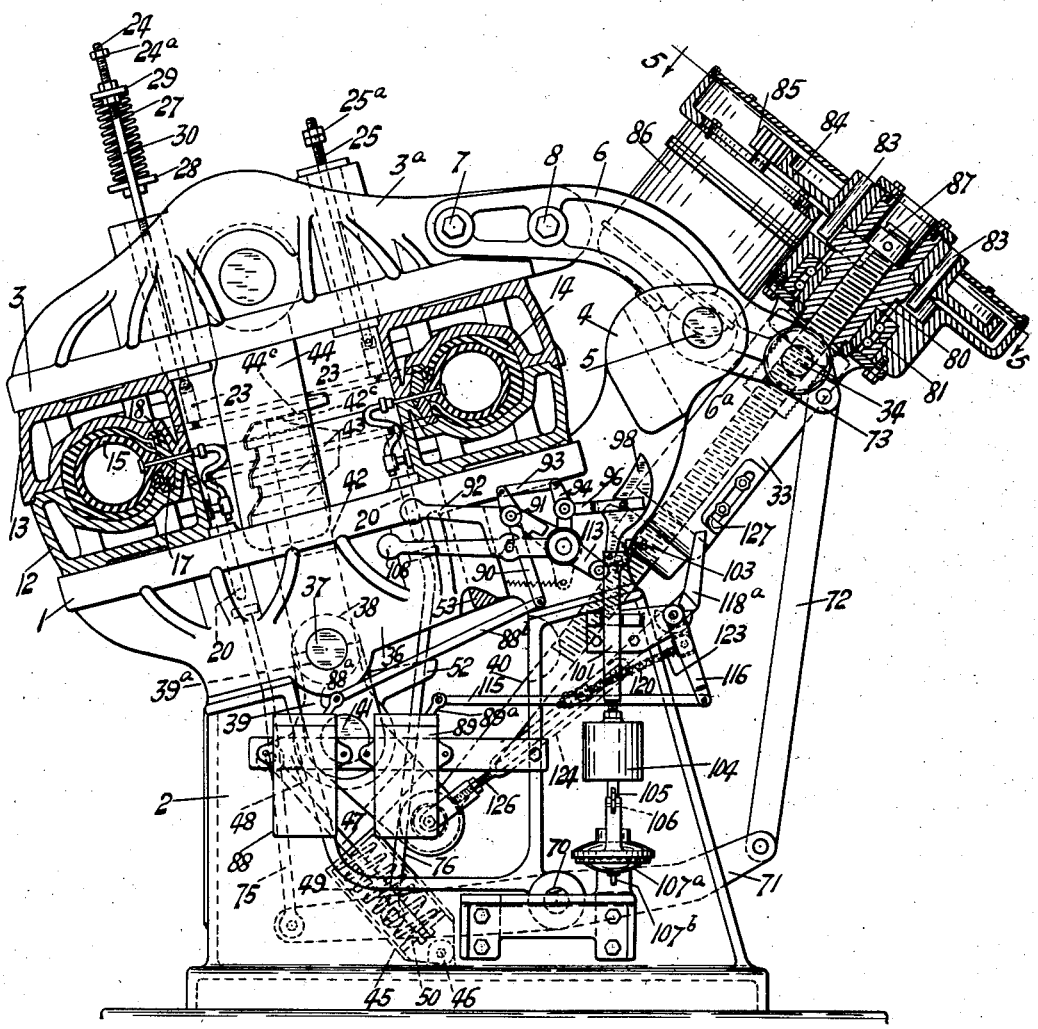
Figure 2 is a similar view showing the vulcanizer in closed position.

The lever 39, in its bifurcated portion, is provided with a pin 41 on which is pivotally carried a locking post 42, formed at its upper end with a plurality of claw-like ribs or formations 43, which cooperate with a mating locking block 44 secured to the upper or movable platen 3. In order to hold the post 42 in normally forward position, a tension device is provided, which may comprise a pivoted casing 45 pivoted to the base as at 46. A link 47 is pivotally connected to a lug 48 extending from the post 42 and extends into the casing 45 where a compression spring 49 is confined, bearing against a plate 50 on the lower end of the link. This tension device serves to swing the locking post 42 about the shaft 41 to hold it forward against and in engagement with the locking block 44. The locking post 42 is also provided with a lug 52 which is adapted to cooperate upon the retraction of the head 33 with a stop 53 on the lower platen 1 as shown in Figures 1 and 2 to disengage the locking post 42 and the locking block 44 as hereinafter more fully described.

The locking block 44 is carried by the upper mold section and depends therefrom so as to project through the mold in position to be engaged by the locking post. The construction of this locking block and its supporting and controlling devices is fully described in application, Serial No. 451,973, filed May 13, 1930, and need not be described in detail here.

It will be evident that the interlocking portions of the locking post 42 and block 44 may take a plurality of shapes. However, in the preferred form the locking block 44 is formed with a semi-circular groove or socket in its lower end, the walls of which, as best shown in Figures 1 and 2, are formed with a series of buttress-shaped ribs 68 having flat upper surfaces. The locking post 42 is likewise formed at its upper end with the series of buttress-shaped but reversely disposed ribs 43a to cooperate with the ribs of the block 44. The faces of the locking formations are tapered as shown so that the plurality of ribs and buttresses will properly engage throughout their entire locking surfaces. The end of the locking post and of the socket in the locking block are slightly tapered as at 44c and 42c to permit the locking post and block to more readily slide into and out of engagement. These tapered surfaces also contact in the breaking of the toggle to crack the mold sections apart as hereafter explained.

As the vulcanizer is opened, the lower bead ring is lifted from its seat in the lower mold section, carrying the tire away from the lower mold surface. In order to move the rods 20 to lift the bead ring 17 and tire 14 away from the lower mold half 12, the following mechanism is provided. A shaft 70 in the base 2 pivotally carries a pair of rocker levers 71, the ends of which are pivotally connected by links 72 to the extensions 73 on the ends of the arms 6a. Push rods 75 and 76 are pivotally attached to the forward ends of the rocker levers 71 and extend slidably through the lower platen 1 in position to engage with and elevate the rods 20 when the levers 71 are actuated during the opening of the vulcanizer. It will be seen from the drawings that the push rods 75 and 76 are connected to the lever 71 at different distances from the pivoting shaft 70. This construction causes the push rods 75, which are at the outer ends of the levers, to travel farther than the rods 76 so that in the open position the lower bead ring 17 and tire 14 will be carried as shown in Figure 1 with respect to the lower mold 12. The object of this arrangement is to insure the more rapid elevation of the front side of the bead ring, so that the tire is peeled away from the lower mold surface. When the vulcanizer is open, the ring acts as a seat to receive the green tire which is lowered into contact with the mold section 12 as the vulcanizer is closed. This prevents premature contact of the tire with the one side of the mold. The tire is stripped from the upper mold section by expansion of the springs 27 which are compressed against the plates 29 upon the closing of the vulcanizer. The fact that one side of the upper bead ring 18 only is spring supported and that that side is permitted a greater degree of travel, also serves to peel the tire away from the upper mold section.

Figure 5:
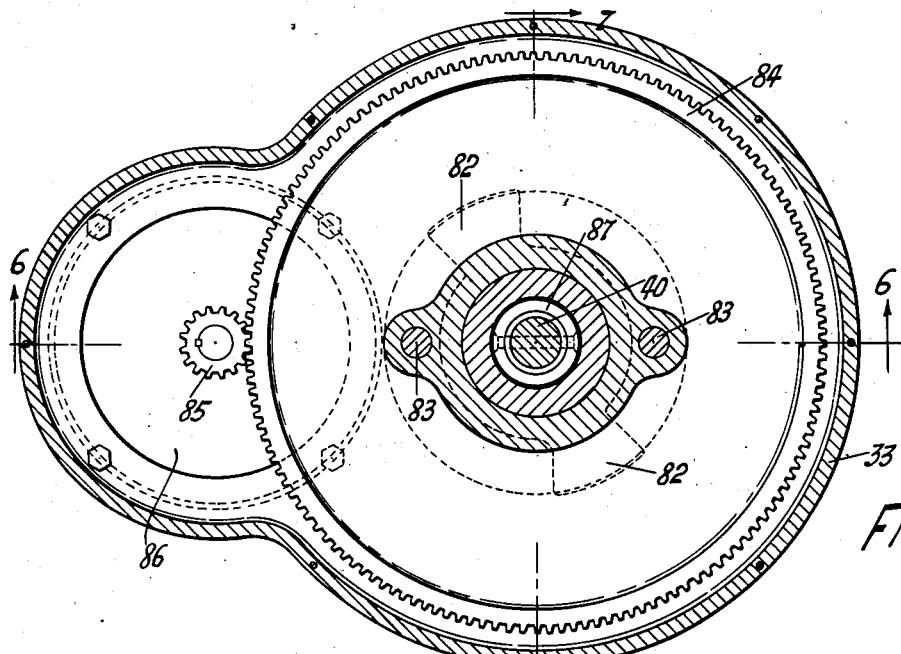
Figure 5 is a section on line 5—5 of Figure 2.
Figure 6:
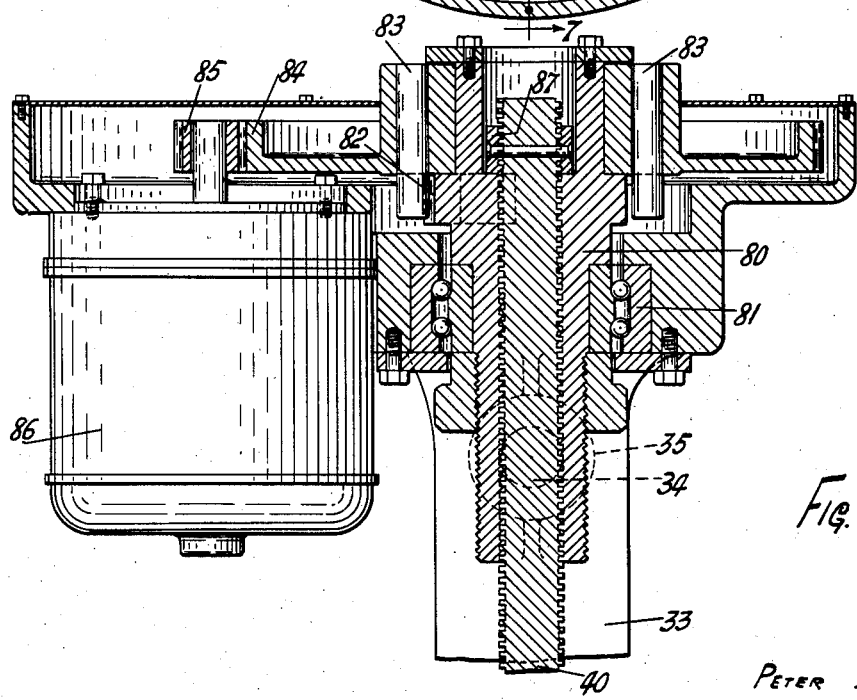
Figure 6 is a section on line 6—6 of Figure 5.

The rod 40 extends through head 33 and is threaded through a nut 80 therein journaled in bearing 81. Nut 80 has lugs 82, 82 thereon (see Figures 5 and 6) adapted to be engaged by pins 83, 83 on a gear 84 journaled on said nut, which gear is meshed with a pinion 85 on the shaft of a reversible motor 86 mounted on head 33. A collar 87 is secured to the upper end of the rod 40 to limit movement of the head upwardly of said rod.

For operating the motor switches 88 and 89 are employed. Switch 88 has an operating arm 88$^a$ connected by a link 88$^b$ with a lever 90 to which is secured at 91 an operating arm 92. Lever 90 is connected by a link 93 with an arm 94 on a shaft 95 on which is another arm 96 which is provided with a pin 97 for engaging with a latch 98 having a notch 99 therein for receiving the pin. Latch 98 is pivoted at 100 on a vertically reciprocable bar 101 and has a spring 102 acting thereon so as to urge the latch into latching engagement, an adjustable screw 103 limiting movement of the latch out of latching engagement. Bar 101 has a weight 104 thereon and is connected to a lever 105, which lever is pivoted at 106 and in turn is connected by member 107 to the pressure responsive diaphragm (not shown) of a pressure responsive controlled which is connected onto the system for supplying a pressure medium to the pressure bag 15 as will later be explained. A safety lever 108 (hand operated) is pivoted at 109 and has a pin 110 thereon extending between lugs 111, 112 on lever 92 which lugs by engagement with pin 110 limit movement of control lever 92. Lever 108 has an arm 113 connected thereto and carrying a pin 114 for engaging latch 98 to disengage said latch from pin 97 whereby the control lever 92 may be actuated to start the motor to close the press.

Switch 89 has an operating arm 89$^a$ connected by a link 115 with a lever 116 secured on shaft 117. A bell-crank lever pivoted on shaft 117 has an arm 118 to which is swiveled a sleeve 119 slidable on a rod 120 pivoted at 121 to a yoke 121$^a$ secured on shaft 117, a nut limiting outward movement of said sleeve and a spring 123 normally urging said sleeve outwardly. A slotted link 124 slidably engages a pin 125 on arm 118 and is adjustably secured as at 126 with the lower end of rod 40 for swinging the bell-crank lever 118 to operate lever 116 in one direction as the press closes. The other arm 118$^a$ of the bell-crank is arranged to be engaged when the press is opening by a projecting element 127 adjustably secured on head 33 to swing bell-crank 118$^a$ to operate lever 116 in the other direction as the press opens. As will be apparent lever 116 is snapped over quickly from one position to the other (see Figures 1 and 3) as the bell-crank swings rod 120 to one side or the other of lever 116, spring 123 being compressed as the rod swings to a dead center position and the stress in the spring being released as the rod swings through a dead center position respecting lever 116 and bell-crank 118, 118$^a$. Stops 118$^b$ and 118$^c$ may be utilized to limit movement of bell-crank 118, 118$^a$ in both directions.

Since the construction and operation of the vulcanizer press shown herein is fully illustrated, described and claimed in copending application, Serial No. 451,973 filed May 13, 1930, it will not be necessary to set forth the operation thereof herein excepting the relation to the operation and control of the power-actuated head 33 and rod 40 which are employed instead of the fluid pressure cylinder disclosed in said application.

Figure 8:
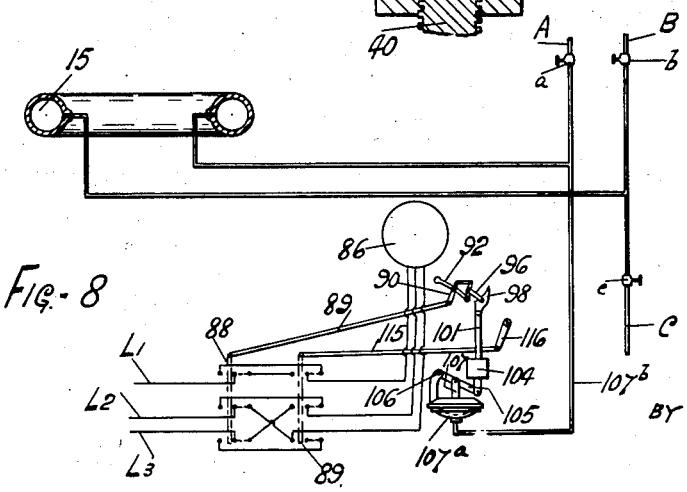
Figure 8 is a diagrammatic view illustrating the wiring and fluid pressure system for the pressure bag by which pressure may be applied to the inside of a tire in said vulcanizer.
Figure 9:
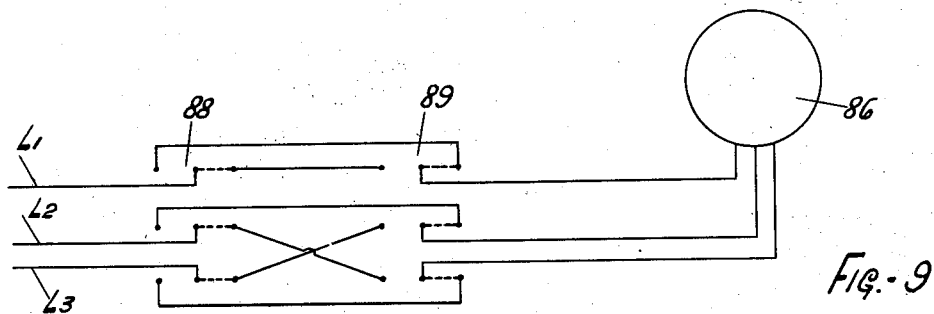
Figure 9 is a diagrammatic view of the wiring to the motor and switches showing the switches as set when the vulcanizer is open.
Figure 10:
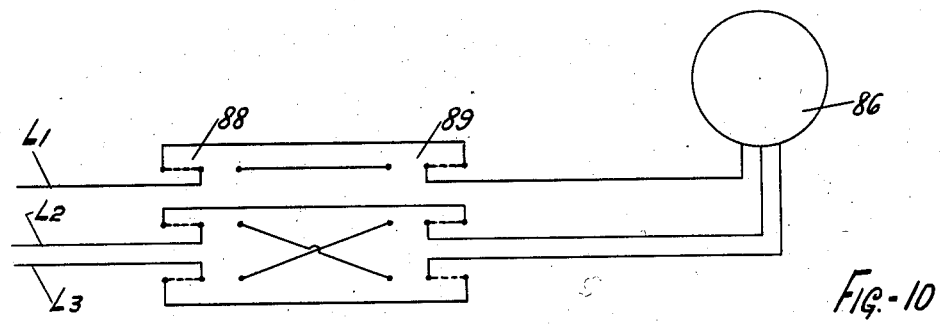
Figure 10 is a similar view showing the set of the switches when the vulcanizer is being closed.
Figure 11:
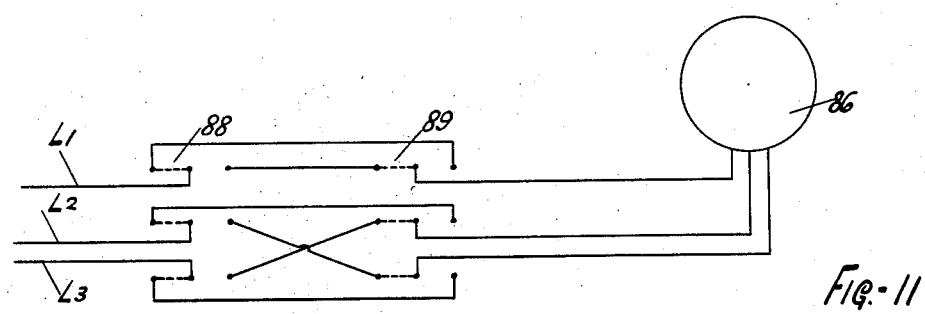
Figure 11 is a similar view showing the set of the switches when the vulcanizer is closed.

Referring to the diagram in Figures 8 to 12, the power lines L$_1$, L$_2$ and L$_3$ are connected through switch 88 and 89 in the manner shown to the motor 86 whereby when in open position the blades or contact making and breaking arms of the switches are connected as indicated by the dotted line connections (Figures 8 and 9). When the vulcanizer is to be closed (the tire with the enclosed pressure bag being mounted therein as in Figure 1), switch 88 is actuated to establish the connections as indicated in Figure 10. This is accomplished by first swinging down lever 108 to disengage latch 98 from arm 96 and then swinging down lever 92 which is released when said latch is disengaged, linkage 93 now permitting lever 90 to be swung by arm 92 to pull link 88$^b$ and consequently arm 88$^a$ to the right, which movement is utilized in the switch in a manner not shown to establish the connections as illustrated in Figure 10. This drives the motor which through the clutch pins 83 and lugs 82 drives nut 80 and first moves head 33 upwardly of rod 40 until the press is closed (head 33 engaging collar 87), continued rotation of the screw forcing rod 40 downwardly until the press is locked and pressure applied thereto in the manner of the press as disclosed in the copending application referred to above. When latch 98 is disengaged, there being no pressure in the pressure responsive device 107$^a$, the weight 104 is in a lowered position.

As the rod 40 moves the toggle mechanism under the lower platen to locked position in which the press platens are drawn together under pressure through the center lock this applies a stalling force on the motor and switch 89 is actuated to disconnect the power lines L$_1$, L$_2$ and L$_3$ from the motor. This is accomplished by engagement of the upper end of the slotted link 124 with pin 125 on lever arm 118 swinging the bell-crank lever 118, 118$^a$ from the position shown in Figure 1 to the position shown in Figures 2 and 3 and consequently swinging lever 116 so as to draw link 115 to the right which swings switch arm 89$^a$ to the right and in the switch causes the contact blades or members shown in the dotted lines in Figures 9 to 12 to move from the positions shown in Figure 10 to the positions shown in Figure 11 which stops the motor and also sets the connections by reason of the crossed leads shown between the switches whereby upon return of switch 88 after the vulcanization to its original setting the motor 86 will be driven reversely.

When the vulcanizer is closed fluid under pressure is supplied pressure bag 15 as by the piping illustrated in Figure 8. This piping may include a supply line A connected to the bag through a valve $a$, an outlet line B having a control valve $b$ by which the pressure medium (which may be heated) may be circulated through the bag under pressure and a drain line C controlled by a valve $c$. Circulation of the heated pressure medium in the bag 15 is effected during the vulcanization by opening valves $a$ and $b$, valve $c$ being closed. When the pressure is established in the bag it is also established in the pressure responsive device 107$^a$ by a connection 107$^b$ from supply line A. This pressure is utilized to raise the vertically reciprocal bar 101 to reengage latch 98 with the pin 97 on bell-crank arm 96 in the raised position which this arm assumed when the lever 92 was actuated to close and lock the vulcanizer under pressure. The vulcanizer and its controls remain in this condition until the vulcanization is completed.

Upon completion of the vulcanization valves $a$ and $b$ are closed and drain valve $c$ is opened which relieves the pressure on the pressure bag 15 and in the pressure responsive device 107ª. This device is so adjusted that when the pressure falls a predetermined amount weight 104 will descend drawing down bar 101 which through arms 96 and 94, link 93, lever 90 and link 88ᵇ swings switch arm 88ª back to its original position (Figure 1) and throws the contact blades or elements shown in dotted lines in switch 88 in Figures 9 to 12 from the positions shown in Figure 12. This returns the starting lever 92 to its original position (Figure 1). Motor 86 is accordingly driven reversely acting first by rotation of nut 80 to relieve the pressure through the center lock and disengaging this lock by pulling member 40 upwardly and then upon continued rotation of the nut 80 to move head 33 upwardly on rod 40 to swing the vulcanizer open. As will be apparent the motor 86 is started freely in reverse during a short period until pins 83 move into engagement with the opposite sides of lugs 82 from those engaged when the press was closed to bump slightly against these lugs to break the press toggles from the locking stress which was set up therein under the stalling force of the motor.

Figure 3:
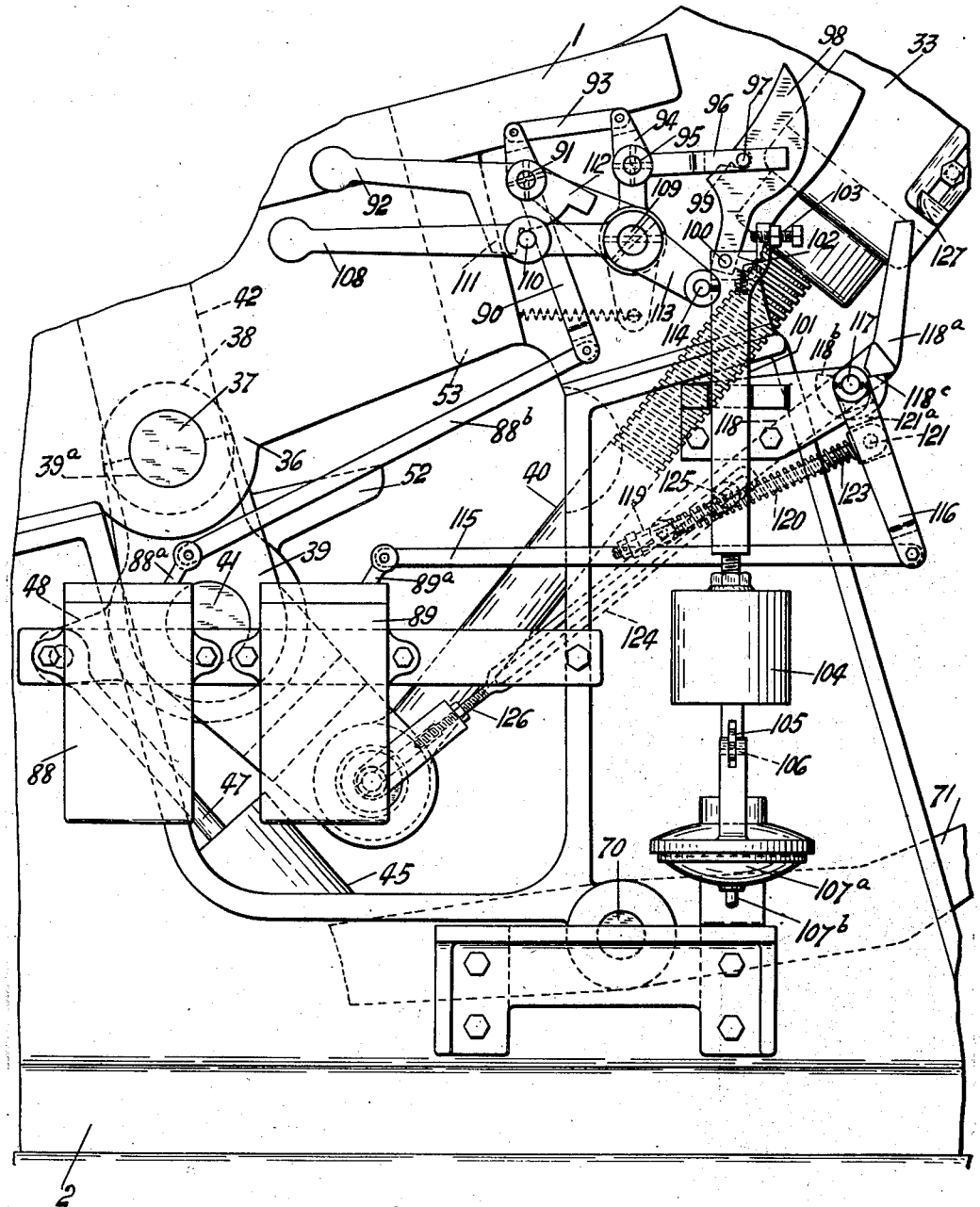
Figure 3 is an enlarged side elevation of the vulcanizer showing the actuating and control mechanism when the vulcanizer is closed.
Figure 4:
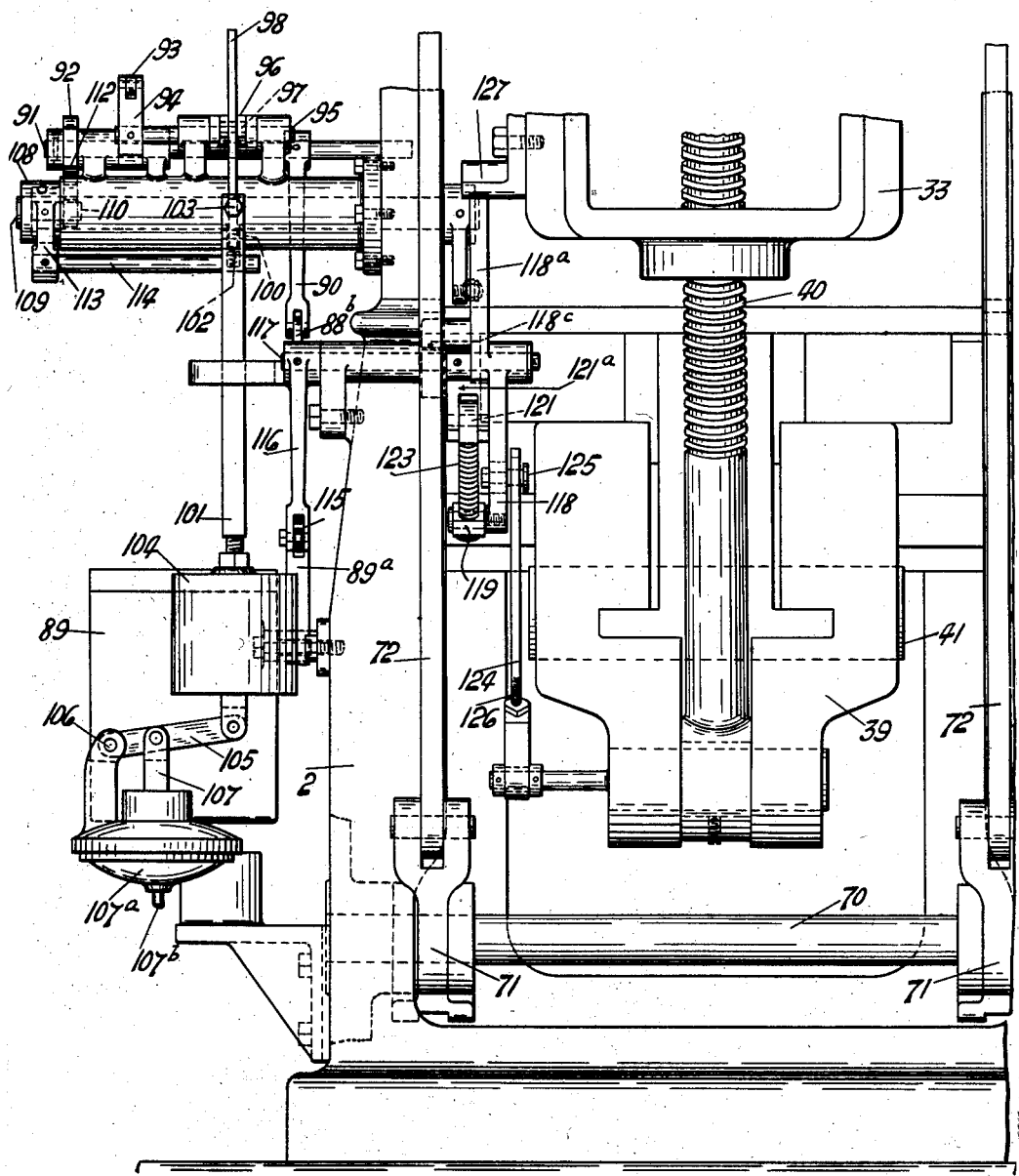
Figure 4 is a right end elevation of that portion of the vulcanizer as shown in Figure 3.
Figure 12:
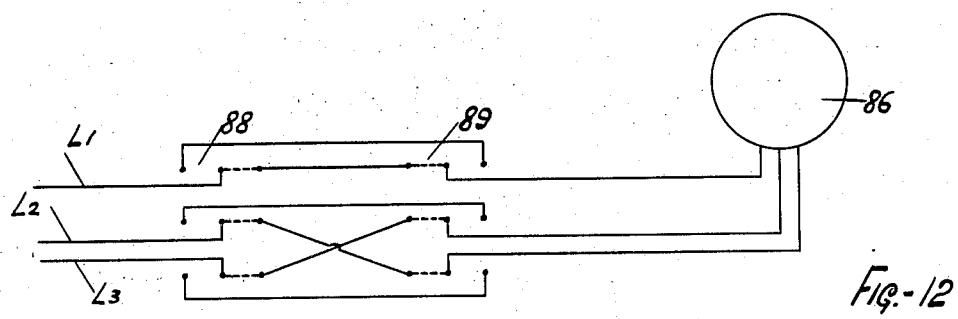
Figure 12 is a similar view showing the set of the switches when the vulcanizer is being opened.

As the upper press platen moves into its fully opened position, the element 127 on head 33 engages bell-crank arm 118ª, swinging it to the left from the position shown in Figure 3 and consequently swinging bell-crank arm 118 to the right of lever 116 whereby spring 123 forces lever 116 to the left which through link 115 throws switch arm 89ª to the left which throws the contact elements of switch 89 as shown in dotted lines in Figures 9 to 12 from their positions in Figure 12 to their positions in Figure 9 stopping the motor and resetting the connections for a subsequent use of the vulcanizer. Valve c is closed before such subsequent use of the vulcanizer as will be understood.

It will be apparent that by utilizing suitable well-known timing devices to be started upon operation of valves a, b and c at the beginning of a cure and to actuate said valves at the end of the cure, the operation of the press may be made fully automatic after the starting lever 92 has been actuated.

Modifications of the invention may be resorted to without departing from the spirit thereof or the scope of the appended claims.

What is claimed is:—

1. Apparatus for operating a press of that type in which the work is treated for a considerable interval of time while the press remains closed, said apparatus comprising a reversible electrical motor, means for connecting power to said motor to close the press, means automatically operable when the press is closed to disconnect said power from the motor and to set the connections for reversing the motor upon a subsequent connection of power thereto, means for supplying a work-treating medium to the press to be effective therein over a considerable interval of time, means operable by removal of the work treating medium from the press at the end of said interval for connecting power to said motor to open the press, and means operable when the press opens to disconnect the power from the motor and to reset the power connections for closing the press upon a subsequent operation of said first-named means.

2. The combination with a press of means for closing the press and additional means for applying pressure thereto when closed, of a reversible electrical motor mechanism comprising relatively movable elements, one connected to the press closing means and the other connected to the press applying means for actuating said press, means operable by the motor for relatively moving said members to close and apply pressure to the press and to relieve said pressure and open the press; means for connecting power to the motor to drive it in one direction to close and apply pressure to the press; means for disconnecting power from the motor when said pressure is applied and for resetting the connections to the motor to reverse upon a subsequent connection of power thereto, means for connecting power to the motor to relieve said pressure and open the press; and means operable when the press is opened to disconnect power from the motor and reset the connection thereto whereby the motor may be operated to close and apply pressure to the press upon a subsequent operation of said first-named power connection means.

3. The combination with a press of means for closing the press and additional means for applying pressure thereto when closed, of a reversible electrical motor mechanism comprising relatively movable elements, one connected to the press closing means and the other connected to the pressure applying means for actuating said press, means operable by the motor for relatively moving said members to close and apply pressure to the press and to relieve said pressure and open the press; means for connecting power to the motor to drive it in one direction to close and apply pressure to the press, means for disconnecting power from the motor when said pressure is applied and for resetting the connections to the motor to reverse upon a subsequent connection of power thereto, means for connecting power to the motor to relieve said pressure and open the press, and means operable when the press is opened to disconnect power from the motor and reset the connection thereto whereby the motor may be operated to close and apply pressure to the press upon a subsequent operation of said first-named power connecting means, said means for relatively moving said member including a clutch including relatively movable elements adapted to permit starting of said motor freely or under no load before said elements engage to relieve said pressure and open said press.

4. The combination in a press for vulcanizing hollow rubber articles, of a reversible electrical motor for closing and opening said press, means operable by said motor for relatively moving the press members, means for supplying a pressure medium to the interior of the articles during vulcanization, means for connecting power to the motor to close the press, means automatically operable when the press is closed to disconnect the power from said motor and to set connections to the motor for reverse operation thereof upon a subsequent connection of power thereto, pressure responsive means controlled by the pressure in the articles for connecting the power to said motor to open the press when pressure in the articles is relieved, and means automatically operable when the press is fully opened to disconnect the power from said motor and to reset the connections thereto whereby it will be driven in a direction to close the press upon a subsequent operation of said first-named power-connecting means.

5. A press, rotary power driven means for operating the press to close and open the same, and means for connecting said rotary power means to the press comprising a head, a rotary member in the head and driven by said rotary power means and a screw threaded through said member, a toggle mechanism actuated by said rotary member and screw to hold the press closed under pressure, there being a clutch between said motor and said rotary member comprising relatively movable members automatically operated and constructed and arranged to permit starting of the motor under no load and utilizing momentum of the started motor upon engagement when the press is opened to break the toggle.

6. A press including means for closing and opening the same and additional means for applying pressure thereto when closed, a rotary power driven means for operating the press to close and open the same and to apply pressure thereto, relatively movable members, one connected to the closing and opening means and the other connected to the pressure applying means for operating said press, driving connections between said rotary power means and said relatively movable members, said driving connections being adapted first to move one of said members to close the press and then to move the other member to apply pressure to the press.

7. A press including means for closing and opening the same and additional means for applying pressure thereto when closed, a rotary power driven means for operating the press to close and open the same and to apply pressure thereto, relatively movable members, one connected to the closing means for operating said press, driving connections between said rotary power means and said relatively movable members, said driving connections being adapted first to move one of said members to close the press and then to move the other member to apply pressure to the press, said driving connections including a head connected with the press closing and opening means and a rotary member in the head and driven by said rotary power means, and a screw connected with the pressure applying means and threaded through said rotary member.

8. A press including means for closing and opening the same and additional means for applying pressure thereto when closed, a rotary power driven means for operating the press to close and open the same and to apply pressure thereto, relatively movable members, one connected to the closing means for operating said press, driving connections between said rotary power means and said relatively movable members, said driving connections being adapted first to move one of said members to close the press and then to move the other member to apply pressure to the press, said driving connections including a head connected with the press closing and opening means and a rotary member in the head and driven by said rotary power means, and a screw connected with the pressure applying means and threaded through said rotary member, the leverage of the connection from the head to the press opening and closing means being substantially greater than the leverage of the connection of the screw to the pressure applying means whereby the closing and opening means will be operated to close the press before the pressure applying means is operated to apply the pressure thereto.

9. A press including means for closing and opening the same and additional means for applying pressure thereto when closed, a rotary power driven means for operating the press to close and open the same and to apply pressure thereto, relatively movable members, one connected to the closing and opening means and the other connected to the pressure applying means for operating said press, and driving connections between said rotary power means and said relatively movable members, said driving connections being adapted first to move one of said members to close the press and then to move the other member to apply pressure to the press, the leverage of the connection from the power driven means to the press opening and closing means being substantially greater than the leverage of the connection from the power driven means to the pressure applying means whereby the closing and opening means will be operated to close the press before the pressure applying means is operated to apply the pressure thereto.

10. A press including relatively movable members, electrically operable power means for closing and opening said members, means for introducing a pressure medium between said members, and pressure responsive means for controlling said electrically operable power means whereby the latter is actuated to open said press only when the pressure of said medium between said members is relieved.

11. A press for shaping articles under fluid pressure comprising relatively movable members for receiving the articles therebetween, means for supplying a fluid under pressure to apply to an article between said members, electrically operable means for opening and closing said press, and means responsive to the pressure of said medium controlling said electrically operable means for actuating the same to open said press upon relief of the fluid pressure on said article.

12. Apparatus for operating presses comprising relatively moving platens which comprises a reversible electrical motor driven mechanism, and means for controlling the same, including means for connecting power to said motor in one direction to close the press, means automatically operable when the press is closed to disconnect the power from said mechanism and to set the power connections whereby said mechanism will reverse upon a subsequent operation thereof, means for supplying a work treating medium to the press, means for connecting power to the mechanism to open the press, means automatically operable to disconnect power from said mechanism when the press has opened and to reset the power connections to close the press upon a subsequent connection of power thereto, said connecting means including interconnected switches having operating arms and mechanical connections between relatively movable parts of the press and said switches for operating the same, said mechanical connections including means automatically operable when the press is closed by actuation of one switch to actuate the other switch to stop the motor and set the connections thereto so that it will reverse and means automatically operable when the vulcanizer is opened by actuating the first-named switch to actuate said other switch to stop the motor and reset the connections thereto for a subsequent closing operation, and means automatically operable upon removal of the work-treating medium for actuating said first-named switch to open the press.

PETER DE MATTIA.